US012572954B2

(12) United States Patent
Vuyyuri et al.

(10) Patent No.: US 12,572,954 B2
(45) Date of Patent: Mar. 10, 2026

(54) METHODS AND APPARATUS FOR DETERMINING ITEM DEMAND AND PRICING USING MACHINE LEARNING PROCESSES

(71) Applicant: Walmart Apollo, LLC, Bentonville, AR (US)

(72) Inventors: Harshada Haribabu Vuyyuri, Telangana (IN); Ketki Aniruddha Gupte, Bangalore (IN); Xiaolin Pang, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 163 days.

(21) Appl. No.: 17/587,763

(22) Filed: Jan. 28, 2022

(65) Prior Publication Data

US 2023/0245154 A1 Aug. 3, 2023

(51) Int. Cl.
*G06Q 30/0201* (2023.01)
*G06Q 10/0631* (2023.01)

(52) U.S. Cl.
CPC ... *G06Q 30/0206* (2013.01); *G06Q 10/06315* (2013.01)

(58) Field of Classification Search
CPC ......... G06Q 30/0206; G06Q 10/06315; G06Q 30/0202; G06Q 30/0283
See application file for complete search history.

(56) References Cited

U.S. PATENT DOCUMENTS

| | | | |
|---|---|---|---|
| 2008/0201271 A1 | 8/2008 | Davis et al. | |
| 2018/0075401 A1* | 3/2018 | Harsha ............... | G06Q 30/0202 |
| 2019/0130425 A1* | 5/2019 | Lei ..................... | G06Q 30/0201 |
| 2022/0383145 A1* | 12/2022 | Sen ........................ | G06N 3/045 |
| 2023/0222526 A1* | 7/2023 | Mahdavi Pajouh ......................... | |
| | | | G06Q 30/0211 |
| | | | 705/7.31 |

OTHER PUBLICATIONS

Keskin et al., "Chasing Demand: Learning and Earning in a Changing Environment," Mathematics of Operations Research, vol. 42, No. 2, pp. 277-307 (Year: 2017).*
Pal et al., Applications of Regression Techniques (eBook) (Year: 2019).*

(Continued)

*Primary Examiner* — Resha Desai
*Assistant Examiner* — Patrick Kim
(74) *Attorney, Agent, or Firm* — Morgan, Lewis & Bockius LLP; Manita Rawat

(57) ABSTRACT

This application relates to employing trained machine learning processes to predict demands of items during future temporal periods, and to determining a recommended price for the items. For example, a computing device may obtain sales data for an item, and may generate features based on the obtained sales data. The computing device may input the generated features to a trained machine learning process to generate output data characterizing a predicted demand of the item during a future temporal interval. Further, the computing device may determine a recommended price for the item based on the predicted demand and a budget allocation that corresponds to the item. The computing device may store the predicted demand of the item and the recommended price for the item in a data repository.

20 Claims, 8 Drawing Sheets

(56) References Cited

OTHER PUBLICATIONS

Li et al., "Forecasting of Chinese E-Commerce Sales: An Empirical Comparison of ARIMA, Nonlinear Autoregressive Neural Network, and a Combined ARIMA-NARNN Model," Mathematical Problems in Engineering, vol. 2018, 6824960 (Year: 2018).*

Javier Couto, et al., "How Machine Learning is reshaping Price Optimization," Apr. 16, 2020, 16 pages.

BRIDGEi2i, "OPTIMIZER AI-powered Dynamic Planning," 2021, 11 pages.

LS Tech Ltd., "Profitability Analytics For Operators Of Complex It Infrastructure," 2018, 6 pages.

Taylor Wells, "Everyday Low Pricing A Bargain Offer Or A Pricing Trick Distorting Value," Nov. 25, 2020, 15 pages.

* cited by examiner

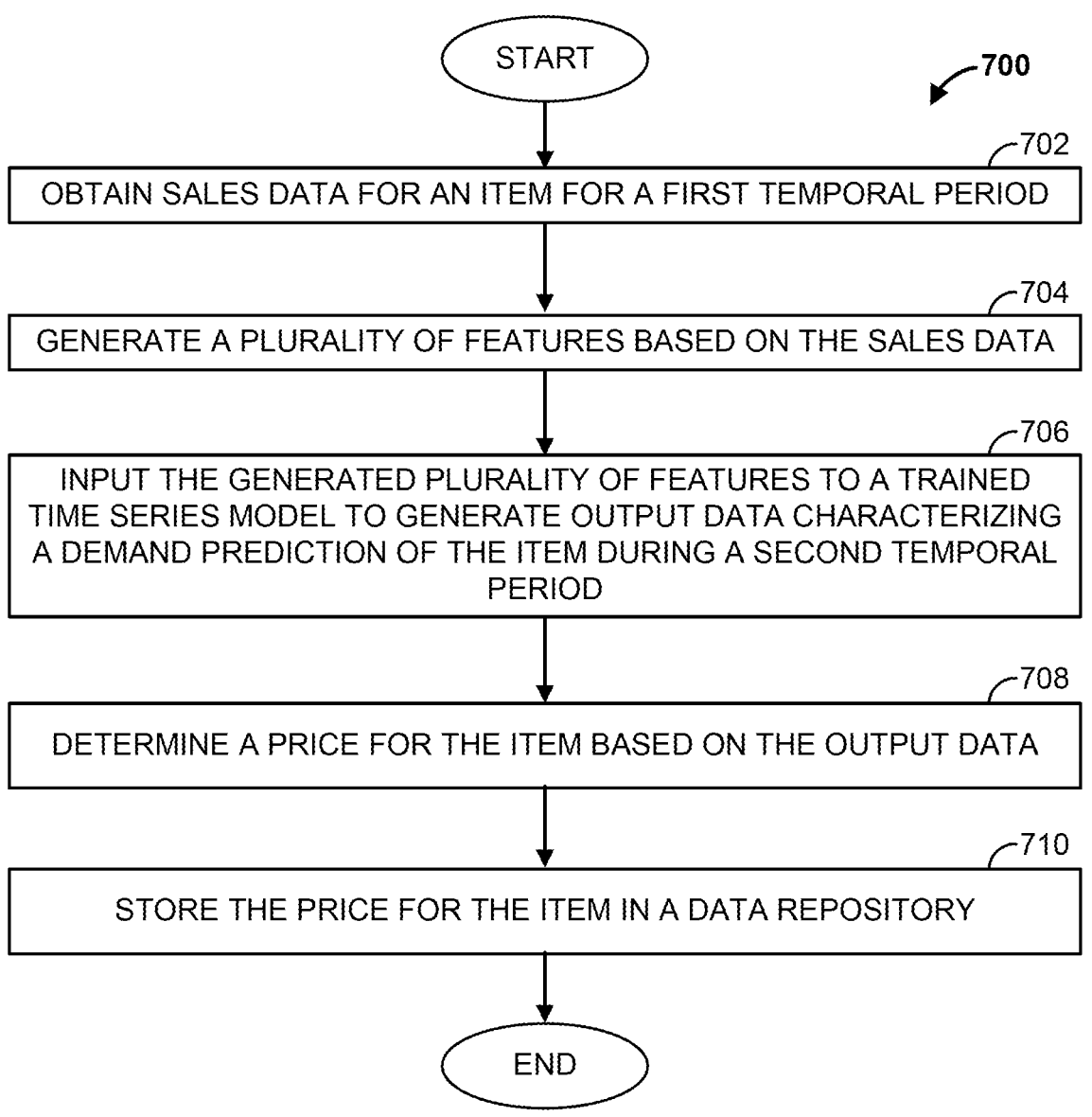

START

700

702

OBTAIN SALES DATA FOR AN ITEM FOR A FIRST TEMPORAL PERIOD

704

GENERATE A PLURALITY OF FEATURES BASED ON THE SALES DATA

706

INPUT THE GENERATED PLURALITY OF FEATURES TO A TRAINED TIME SERIES MODEL TO GENERATE OUTPUT DATA CHARACTERIZING A DEMAND PREDICTION OF THE ITEM DURING A SECOND TEMPORAL PERIOD

708

DETERMINE A PRICE FOR THE ITEM BASED ON THE OUTPUT DATA

710

STORE THE PRICE FOR THE ITEM IN A DATA REPOSITORY

END

FIG. 7

METHODS AND APPARATUS FOR DETERMINING ITEM DEMAND AND PRICING USING MACHINE LEARNING PROCESSES

TECHNICAL FIELD

The disclosure relates generally to machine learning processes and, more specifically, to automatically determining item demand and pricing using machine learning processes.

BACKGROUND

Retailers and manufactures typically determine a price for an item or service that will be offered for sale. Determining the price of the item or service may provide challenges, however. For example, setting the price of the item or service too high may discourage potential buyers, thereby reducing the amount of the item or service that is sold. Setting the price of the item or service too low, however, may result in lower overall revenue from the sales even while increasing the amount of the item or service that is sold. Retailers and manufacturers may also face challenges in determining how much of an item to stock or service to support. For example, retailers may stock an amount of an item that, at least based on the item's selling price, fails to sell corresponding quantities. As another example, retailers may fail to stock enough of an item that sells quickly, such as when the item is priced too low. Retailers and manufacturers may face these and other challenges when determining how much of an item to produce or stock, or how much of a service to support, and what price to offer the item or service for.

SUMMARY

The embodiments described herein are directed to using trained machine learning processes to predict a demand of items and a recommended price of the items during a temporal period (e.g., a week, a month, a quarter, a season, etc.). For example, the embodiments may include generating features based on historical sales data. The historical sales data may include, for example, an amount of each item sold, a date of each sale, and a price of each item sold, including any discount provided, if any. The embodiments may also include applying a trained time-series model to the generated features to predict a demand for an item. Further, the embodiments may include determining a budget allocation amount for a corresponding category of the item. Example categories may include, for example, a food item, outdoor equipment, clothing, housewares, toys, workout equipment, vegetables, spices, cercal, salad dressing, as well as any suitable category for an item. Further, the embodiments may include determining a predicted price (e.g., a recommended price) of the item based on the predicted demand for the item and the budget allocation amount corresponding to the item's category. For example, a retailer may price an item according to the determined price during the temporal period.

Among other advantages, the embodiments may allow a retailer (or a manufacturer or any entity that sells items or services) to predict item demand during future temporal periods (e.g., winter, spring, summer, fall, holiday seasons, etc.). Further, the embodiments may allow the retailer to determine a price for the items during the temporal periods allowing the retailer to increase sales. Further, the embodiments may allow retailers to more reliably manage their inventory. For example, the embodiments may allow the retailer stock appropriate levels of items for sale during the future temporal periods, thereby reducing the likelihood that the retailer stocks too much of an item, or stocks too little of an item. Customers of a retailer may also benefit, such as by having appropriate levels of stock of an item available for purchase (e.g., either in stores or online), and by having, at least in some examples, more favorable pricing of those items. Persons of ordinary skill in the art having the benefit of these disclosures would recognize these and other benefits as well.

In accordance with various embodiments, exemplary systems may be implemented in any suitable hardware or hardware and software combination, such as in one or more suitable computing devices. For example, in some embodiments, a computing device (e.g., server) comprising at least one processor obtains sales data corresponding to a first temporal period of at least one item. The sales data may include a number of sales of the at least one item, and a price that each of the at least one item sold for in each sale. The first temporal period may include, for example, a past temporal period (e.g., last winter, last spring, last summer, last fall, last holiday season, last week, last month, last quarter, etc.). The computing device generates a plurality of features based on the sales data. Further, the computing device inputs the plurality of features to a trained machine learning process to generate output data a demand of the at least one item during a second temporal period. For example, the second temporal period may correspond to a future temporal period (e.g., next last winter, next spring, next summer, next fall, next holiday season, next week, next month, next quarter, etc.). The demand prediction may be a value that characterizes a predicted demand for the at least one item. Further, the computing device determines a price for the at least one item based on the output data. The computing device also stores the price for the at least one item in a data repository.

In some embodiments, a method by at least one processor includes obtaining sales data corresponding to a first temporal period of at least one item. The sales data may include a number of sales of the at least one item, and a price that each of the at least one item sold for in each sale. The first temporal period may include, for example, a past temporal period (e.g., last winter, last spring, last summer, last fall, last holiday season, last week, last month, last quarter, etc.). The method also includes generating a plurality of features based on the sales data. Further, the method includes inputting the plurality of features to a trained machine learning process to generate output data characterizing a demand of the at least one item during a second temporal period. For example, the second temporal period may correspond to a future temporal period (e.g., next last winter, next spring, next summer, next fall, next holiday season, next week, next month, next quarter, etc.). The demand prediction may be a value that characterizes a predicted demand for the at least one item. Further, the method includes determining a price for the at least one item based on the output data. The method also includes storing the price for the at least one item in a data repository.

In some embodiments, a non-transitory computer readable medium has instructions stored thereon. The instructions, when executed by at least one processor, cause a device to perform operations that include obtaining sales data corresponding to a first temporal period of at least one item. The sales data may include a number of sales of the at least one item, and a price that each of the at least one item sold for in each sale. The first temporal period may include, for example, a past temporal period (e.g., last winter, last spring, last summer, last fall, last holiday season, last week, last month, last quarter, etc.). The operations also include generating a plurality of features based on the sales data. Further, the operations include inputting the plurality of features to a trained machine learning process to generate output data characterizing a demand of the at least one item during a second temporal period. For example, the second temporal period may correspond to a future temporal period (e.g., next last winter, next spring, next summer, next fall, next holiday season, next week, next month, next quarter, etc.). The demand prediction may be a value that characterizes a predicted demand for the at least one item. Further, the operations include determining a price for the at least one item based on the output data. The operations also include storing the price for the at least one item in a data repository.

In some embodiments, a computing device comprising at least one processor obtains first sales data of at least one item during a first temporal period. The first sales data may characterize, for example, a number of times one or more items sold during the first temporal period, and a price each item sold for. The computing device also obtains second sales data for the at least one item during a second temporal period. The second sales data may characterize a number of times the one or more items sold during the second temporal period, and a price each item sold for. The first temporal period may precede the second temporal period, for example. The computing device generates a first plurality of features based on the first sales data and the second sales data. The computing device also trains a machine learning process based on the first plurality of features to map the first plurality of features to output data characterizing a predicted demand of the one or more items during the second temporal period. Further, the computing device stores configuration parameters associated with the trained machine learning process in a data repository.

In some embodiments, a method by at least one processor includes obtaining first sales data of at least one item during a first temporal period. The first sales data may characterize, for example, a number of times one or more items sold during the first temporal period, and a price each item sold for. The method also includes obtaining second sales data for the at least one item during a second temporal period. The second sales data may characterize a number of times the one or more items sold during the second temporal period, and a price each item sold for. The first temporal period may precede the second temporal period, for example. The method further includes generating a first plurality of features based on the first sales data and the second sales data. The method includes training a machine learning process based on the first plurality of features to map the first plurality of features to output data characterizing a predicted demand of the one or more items during the second temporal period. The method also includes storing configuration parameters associated with the trained machine learning process in a data repository.

In some embodiments, a non-transitory computer readable medium has instructions stored thereon. The instructions, when executed by at least one processor, cause a device to perform operations that include obtaining first sales data of at least one item during a first temporal period. The first sales data may characterize, for example, a number of times one or more items sold during the first temporal period, and a price each item sold for. The operations also include obtaining second sales data for the at least one item during a second temporal period. The second sales data may characterize a number of times the one or more items sold during the second temporal period, and a price each item sold for. The first temporal period may precede the second temporal period, for example. The operations further include generating a first plurality of features based on the first sales data and the second sales data. The operations include training a machine learning process based on the first plurality of features to map the first plurality of features to output data characterizing a predicted demand of the one or more items during the second temporal period. The operations also include storing configuration parameters associated with the trained machine learning process in a data repository.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 7 is a flowchart of another example method that can be carried out by the demand forecast and price recommendation system 100 of FIG. 1 in accordance with some embodiments.

DETAILED DESCRIPTION

Figure 1:
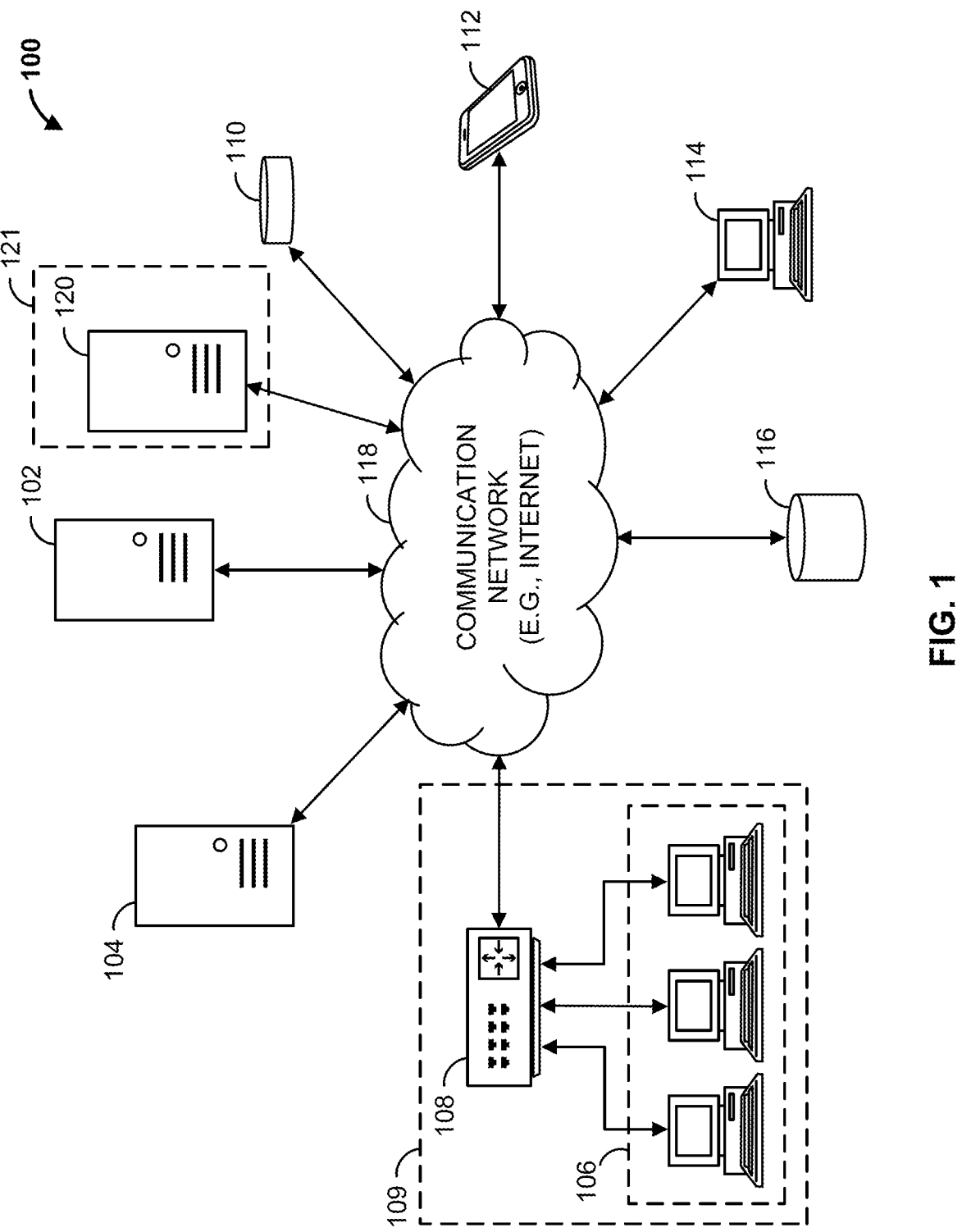
FIG. 1 is a block diagram of a demand forecast and price recommendation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ trained machine learning processes to predict (e.g., forecast) the demand of items (and services) during a future temporal period. The machine learning processes may include, for example, establishing a trained time-series model as described herein. For example, the time-series model may be trained with features generated from sales data to learn to map the features to output data characterizing a demand of the items. Further, the embodiments may determine a price recommendation for the items based on the forecasted demands. For example, the embodiments may apply a price optimizing mixed-integer programming model to the predicted demand of an item to determine a price recommendation for the item during the future temporal period. In some examples, the embodiments apply a budget allocation mixed-integer model to determine a budget allocation for one or more categories of items. The embodiments may apply the price optimizing mixed-integer programming model to the predicted demand of an item and to the budget allocation pertaining to the item's category to determine the price recommendation.

Turning to the drawings, FIG. 1 illustrates a block diagram of a demand forecast and price recommendation system 100 that includes demand forecast and price recommendation (DFPR) computing device 102 (e.g., a server, such as an application server), web server 104, workstation(s) 106, database 116, third-party server 120, and multiple customer computing devices 110, 112, 114 operatively coupled over network 118. DFPR computing device 102, workstation(s) 106, web server 104, third-party server 120, and multiple customer computing devices 110, 112, 114 can each be any suitable computing device that includes any hardware or hardware and software combination for processing data. For example, each of DFPR computing device 102, web server 104, workstations 106, and multiple customer computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of DFPR computing device 102 and third-party server 120 can be a computer, a workstation, a laptop, a server such as a cloud-based server, a distributed computing system, or one or more of any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, demand forecast and price recommendation system 100 can include any number of customer computing devices 110, 112, 114. Similarly, demand forecast and price recommendation system 100 can include any number of workstation(s) 106, DFPR computing devices 102, third-party servers 120, web servers 104, and databases 116.

Workstation(s) 106 are operably coupled to communication network 118 via router (or switch) 108. Workstation(s) 106 and/or router 108 may be located at a store 109, for example. In some examples, workstation 106 is a register at store 109. Workstation(s) 106 can communicate with DFPR computing device 102 over communication network 118.

The workstation(s) 106 may send data to, and receive data from, DFPR computing device 102. For example, the workstation(s) 106 may transmit data related to a transaction, such as a purchase transaction, to DFPR computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104 through, for example, an Application Programming Interface (API).

Database 116 can be a remote storage device, such as a cloud-based server, a memory device on another application server, a networked computer, or any other suitable remote storage. DFPR computing device 102 is operable to communicate with database 116 over communication network 118. For example, DFPR computing device 102 can store data to, and read data from, database 116. For instance, DFPR computing device 102 may store catalog information for a plurality of items, such as items sold at store 109 or on a website hosted by web server 104, within database 116. The catalog information can include, for each of the items, one or more of an item name, and item brand, an item price, an item description, an item category, item substitutes, or any other item attribute or information. Although shown remote to DFPR computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

Third-party server 120 may provide third-party data characterizing item sales by other retailers. For example, a third-party 121, such as a merchant, manufacturer, third-party seller, or a distributor, may maintain sales data characterizing item sales within third-party server 120. In some instances, third-party server 120 transmits the sales data to DFPR computing device 102. The sales data may identify one or more transactions where one or more items were sold, as well as a price and a date of each transaction.

Predicting Item Demand

DFPR computing device 102 may perform operations to map features generated from sales data to output data characterizing a predicted demand. For instance, DFPR computing device 102 may apply a trained machine learning process, such as a trained time-series model, to features generated from sales data for at least one item and corresponding to a first temporal period to generate the output data, where the output data characterizes a demand for the at least one item during a second temporal period. The first temporal period may be a past temporal period (e.g., a previous season), and the second temporal period may be a future temporal period (e.g., an upcoming season). In some examples, DFPR computing device 102 generates the features from the sales data, where the features characterize, for each of one or more items, one or more of a number of the items sold (e.g., volume), a date each of the items sold, and a price that each item sold at.

In some examples, the trained time-series model determines a predicted demand (e.g., volume) of an item, or a category of items, at a point in time (e.g., future point in time) based on a value of a trend at the point in time, and a rate of change of the trend at the point in time. A trend may be an amount of demand of an item during a time period. The demand trend may be linear, random or having seasonality with time. For example, DFPR computing device 102 may execute a trained time-series model that is in accordance with the equations below:

$$\gamma_t = \mu_t + \tau_t + \beta^T x_t + \in_t \qquad \text{(eq. 1)}$$

where:

$$\mu_t = \mu_{t-1} + \delta_{t-1} + \mu_t;$$
$$\delta_t = \delta_{t-1} + \nu_t;$$

$$\tau_t = -\sum_{s=1}^{S-1} \tau_{t-s} + w_t;$$

$\gamma_t$=volume (predicted demand) at time t;
$\mu_t$=value of a trend at time t;
$\delta_t$=slope of the trend at time t;
$\tau_t$=a temporal period (e.g., season) at time t;
$x_t$=regressor (e.g., item price, etc.) used to predict $\gamma_t$;
t=a particular point in time;
$\beta^T$=regression coefficient of predictable variables at time step t; and
$\in_t$=random prediction error at time step.

In some examples, DFPR computing device 102 determines a predicted demand for a category of items based on applying the trained time-series model to each item associated with the category, and combining (e.g., adding) the resulting demand.

To train the time-series model, DFPR computing device 102 may generate first features from sales data for a plurality of items during a first temporal period, and may generate second features from sales data for the plurality of items during a second temporal period. For example, the first temporal period may correspond to a season of one year, and the second temporal period may correspond to the same season of another year. The first features may characterize, for instance, one or more of a number of each of a plurality of items sold during the first temporal period (e.g., 20,000 of one item, 10,000 of a second item, etc.), a price that each one of the number of each of the plurality of items was sold for, a total amount that each of the plurality of items was sold for, an average amount that each of the plurality of items was sold for, event data during the first temporal period (e.g., whether there was a special event, such as a sale event), a date (e.g., a week number), substitute item data (e.g., sale data for items considered to be substitutes for the item), and third-party data (e.g., data characterizing sales of the item, or substitutes for the item, by third-parties during the first temporal period). The second features may characterize a number of each of a plurality of items sold during the second temporal period (e.g., the actual demand seen during the second temporal period). As such, the first features define the input data set, while the second features define the "expected" output data (e.g., the demand for the items seen during the second temporal period). In other words, the time-series model is trained to map the first features (e.g., the input pattern) to the second features (e.g., the output pattern). DFPR computing device 102 may train the time-series model by inputting to the time-series model the first features as the input dataset, and the second features as the expected output data.

In some examples, the machine learning process is trained until at least one metric threshold is satisfied. For example, DFPR computing device 102 may train the time-series model until a loss, such as a mean squared error (MSE) loss, is minimized over the training data set. For example, and during fine-tuning, the weights of the model may be adjusted until the at least one metric threshold is satisfied (e.g., until the at least one metric is below a threshold).

Further, DFPR computing device 102 may generate additional features based on a testing data set, where the testing data set includes features generated from sales data not used in the above described initial training data set, and may apply the initially trained time-series model to the additional features to generate output data characterizing a predicted demand. DFPR computing device 102 may determine a ranking loss (e.g., a triplet loss) based on the output data and an expected demand (e.g., predetermined demand), and may determine whether the ranking loss satisfies a predetermined threshold. If the ranking loss fails to satisfy the predetermined threshold (e.g., the ranking loss is above the predetermined threshold), DFPR computing device 102 may generate an additional training data set and testing data set to continue training the time-series model.

Once trained, DFPR computing device 102 may store the time-series model parameters (e.g., hyperparameters, configuration settings, weights, etc.) associated with the machine learning process within database 116. As such, during inference, DFPR computing device 102 may obtain the parameters from database 116, configure the time-series model or based on the obtained parameters, and execute the machine learning model accordingly.

Determining Budget Allocation

In some examples, DFPR computing device 102 performs operations to determine a budget allocation of one or more categories of items. For example, DFPR computing device 102 may determine, for a category an item pertains to, a budget allocation based on revenue generated from items in the category during a temporal interval, any discount amounts for the category, and investment amounts to each category during the temporal interval. For example, DFPR computing device 102 may execute a budget allocation mixed-integer model that is in accordance with the following equations to determine the budget allocations:

$$\min \sum_{c \in C} \sum_{i \in P} \hat{R}_{i,c}^{\sigma} d_i^c \qquad \text{(eq. 2)}$$

$$\text{s.t.} \sum_{c \in C} \sum_{i \in P} \hat{I}_{i,c} d_i^c \leq B;$$

$$\sum_{c \in C} \sum_{i \in P} \hat{R}_{i,c} d_c^i \geq \hat{R};$$

$$\sum_{i \in P} d_i^c = 1 \forall c \in C; \text{ and}$$

$$d_i^c \in \{0, 1\} \forall i, c,$$

where:

$$\hat{R}_{i,c}^{\sigma} =$$

mean revenue (over a time period) of items in category c with discount percentage i;

$$d_i^c =$$

a binary indicator indicating whether or not to choose a discount percentage i;
$\hat{I}_{i,c}$=investment amount (over the time period) for category c and discount percentage i.

In some instances, DFPR computing device 102 determines the budget allocation for a category of items based on applying the budget allocation mixed-integer model to an amount of revenue generated from the items in the category during the same temporal interval for which features are generated for the trained time-series model for inference. DFPR computing device 102 further determines any discount amounts for the category, and investment amounts to each category, during the same temporal interval.
Determining Item Prices In some examples, DFPR computing device 102 determines a price (e.g., a recommended price) for an item during a future temporal interval based on the predicted demand for the item and, in some examples, the budget allocation for the category of the item. For instance, DFPR computing device 102 may execute price optimizing mixed-integer programming model to the predicted demand of an item and to the budget allocation pertaining to the item's category to determine the price recommendation. In some examples, DFPR computing device 102 executes a budget allocation mixed-integer model that is in accordance with the following equations to determine the price recommendations:

$$\max \sum_{m \in McP_i^m} \sum_{i \in Pm} \hat{R}(p_i^m) \qquad \text{(eq. 3)}$$

$$\text{s.t. } \operatorname{Card}\{p_i^m\} i \in p_m = 1 \forall_m \in M_c$$

$$\sum_{iP_i^m \in p_m} \hat{I}(p_i^m) \le \hat{I}c;$$

$$\sum_{m \in McP_i^m} \sum_{i \in Pm} \hat{V}(p_i^m) \ge \hat{V}c; \text{ and}$$

$$p_i^m \in P_m \forall_m \in M_c,$$

where:

$$R(p_i^m) =$$

mean revenue or item with discount percentage i;

$$p_i^m =$$

set of price change point (e.g., the price discount percentage; e.g., if price discount percentage is 10%, then price change point is 0.01);

$$I(p_i^m) =$$

investment amount for a category given a discount percentage I (e.g., budget allocation for a category generated by the budget allocation mixed-integer model);
$\tilde{V}c$=demand value of category c (e.g., demand value for a category of items generated by the time-series model).

DFPR computing device 102 may store the recommended prices in, for example, database 116. In some examples, DFPR computing device 102 receives a request for a price recommendation for an item for a future temporal period. DFPR computing device 102 may obtain, from database 116, a price determined for the item and that corresponds to the requested future temporal period. For example, DFPR computing device 102 may determine that the requested future temporal period coincides with a temporal period associated with a price for the item. DFPR computing device 102 may transmit the price in response to the received request.

Figure 2:
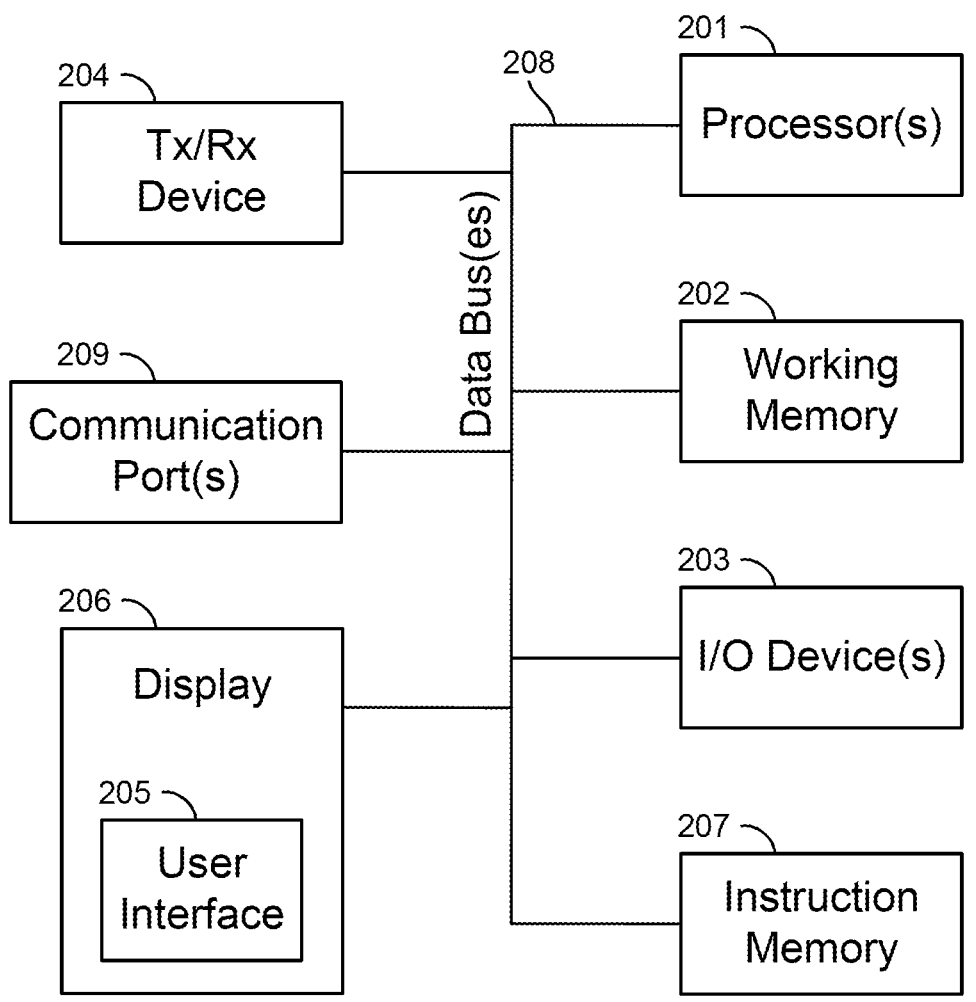
FIG. 2 is a block diagram of an exemplary demand forecast and price recommendation computing device in accordance with some embodiments.

FIG. 2 illustrates an exemplary DFPR computing device 102 of FIG. 1. DFPR computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including training and executing any of the machine learning processes described herein. Instruction memory 207 can be a non-transitory, computer-readable storage medium such as a read-only memory (ROM), an electrically erasable programmable read-only memory (EE-PROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of DFPR computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as training data.

Display 206 can display user interface 205. User interfaces 205 can enable user interaction with DFPR computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 DFPR computing device 102 will be operating in. Processor(s) 201 is operable to receive data from, or send data to, a network, such as communication network 118 of FIG. 1, via transceiver 204.

Figure 3:
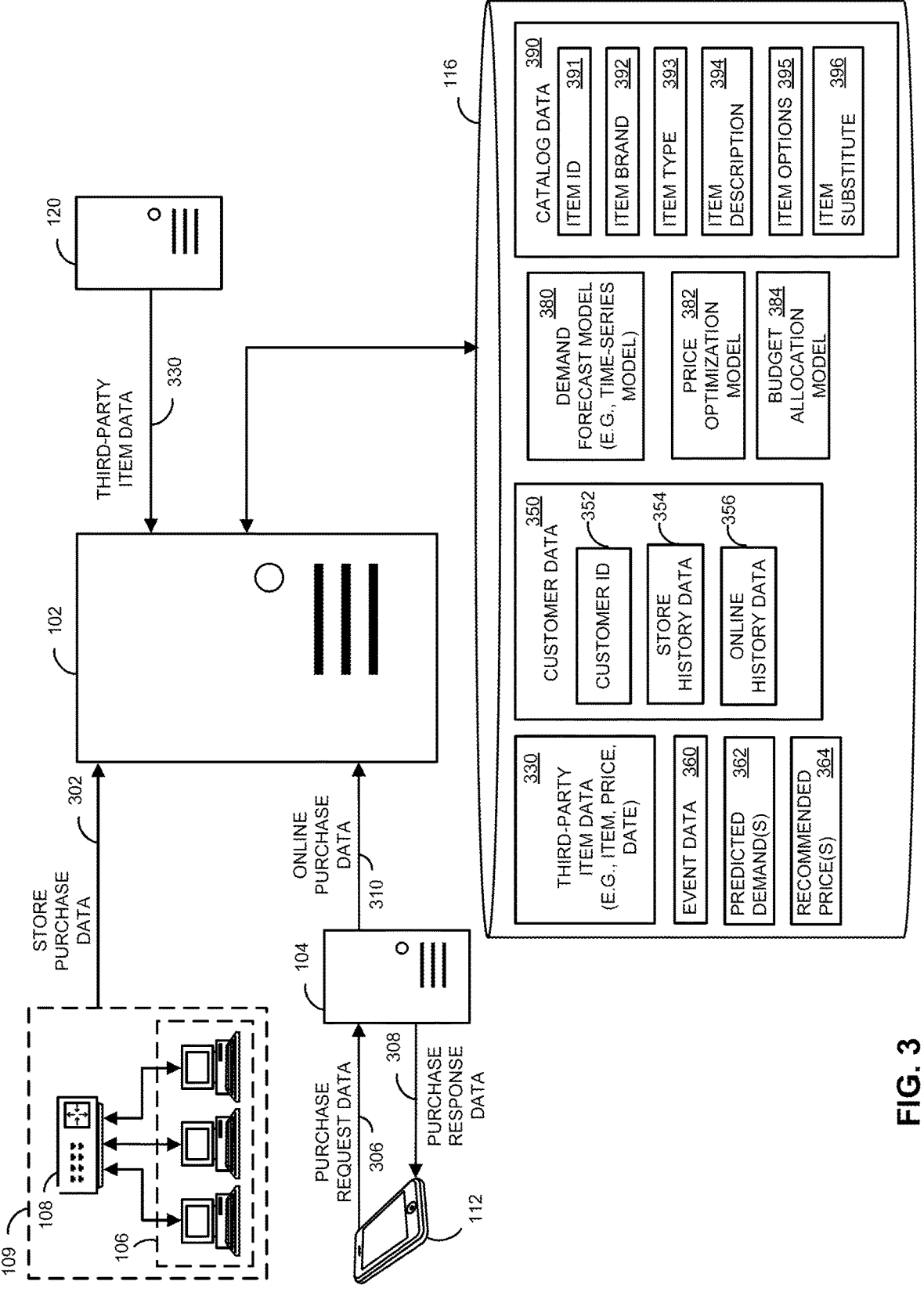
FIGS. 3, 4, and 5A are block diagrams illustrating examples of various portions of the demand forecast and price recommendation system of FIG. 1 in accordance with some embodiments.

FIG. 3 is a block diagram illustrating examples of various portions of the demand forecast and price recommendation system of FIG. 1. In this example, database 116 stores catalog data 390, which may include a catalog of items sold at one or more stores 109 and items sold online. For example, catalog data 390 may include, for each item, an item identifier (ID) 391 (e.g., UPC number, SKU number, etc.), an item brand 392, an item type 393 (e.g., lawn mower, house cleaner, food item, etc.), an item description 394, and item options 395 (e.g., color, size, amount, etc.). Catalog data 395 further includes item substitutes 396, which identify one or more substitutes for each item. Item substitutes may include, for example, similar items but of a different brand.

Database 116 also stores demand forecast model 380, which may include machine learning model parameters (e.g., hyperparameters, configuration settings, weights, etc.) of a trained machine learning model process, such as the time-series model described herein. As described herein, DFPR computing device 102 can retrieve demand forecast model 380 from database 116 to configure a machine learning process to generate, during inference, output data characterizing a demand of items during a temporal period. Database 116 further stores budget allocation model 384 and price optimization model 382. Budget allocation model 384 may include, for example, parameters associated with the budget allocation mixed-integer model described herein. Similarly, price optimization model 382 may include, for example, parameters associated with the price optimizing mixed-integer programming model described herein.

Further, DFPR computing device 102 can receive from a store 109 (e.g., from a computing device, such as workstation 106, at store 109) store purchase data 302 identifying the purchase of one or more items. Store purchase data 302 may include, for example, one or more of the following: an identification of one or more items being purchased; a price of each item being purchased; an identification of the customer (e.g., customer ID, passport ID, driver's license number, etc.); a method of payment (i.e., payment form)

used to purchase the items (e.g., credit card, cash, check); a Universal Product Code (UPC) number for each item; a time and/or date; and/or any other data related to the purchase transaction.

DFPR computing device 102 may parse store purchase data 302 and extract data associated with the purchase, and store the extracted data within database 116. For example, DFPR computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding store history data 354, which may include one or more of the item IDs, item prices, customer ID, payment form, and item UPC numbers for each purchase at store 109.

Similarly, DFPR computing device 102 can receive from a web server 104, such as a web server hosting a retailer's website, online purchase data 310 identifying the purchase of one or more items from the website. For example, web server 104 may receive purchase request data 306 from customer computing device 112, where purchase request data 306 identifies a request to purchase one or more items from a website, such as a retailer's website. Web server 104 may generate online purchase data 310 based on purchase request data 306. For example, online purchase data 310 may include one or more of the following: an identification of one or more items being purchased; a price of each item being purchased; an identification of the customer (e.g., customer ID, passport ID, driver's license number, etc.); a method of payment (i.e., payment form) used to purchase the items (e.g., credit card, cash, check); a Universal Product Code (UPC) number for each item; a time and/or date; and/or any other data related to the purchase transaction. Web server 104 may process purchase request data 104 to establish the purchase of the items, and may generate purchase response data 308 confirming the purchase of the items, and may transmit purchase response data 308 to customer computing device 112. Moreover, web server 104 may generate online purchase data 310 characterizing the purchase, and may transmit online purchase data 310 to DFPR computing device 102. For example, online purchase data 310 may include one or more of: a customer ID, one or more item IDs, one or more item prices, payment form, and one or more item UPC numbers.

DFPR computing device 102 may parse online purchase data 310 and extract data associated with the purchase, and store the extracted data within database 116. For example, DFPR computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding online history data 356, which may include one or more of the item IDs, item prices, item description, customer ID, payment form, item UPC numbers, and delivery time (e.g., a scheduled, or actual, delivery time) for each purchase on the website hosted by web server 104.

In some examples, DFPR computing device 102 receives third-party item data 330 from third-party server 120. As described herein, third-party item data 330 may include sales data for one or more items. For example, third-party item data 300 may include one or more of an item ID, an item brand, an item price, and a sale date for each item.

DFPR computing device 102 may store third-party item data 330 within database 116. Database 116 may further store event data 360, which characterizes special events, such as sale events and holiday seasons, and their corresponding time periods (e.g., dates).

DFPR computing device 102 may apply the trained time-series model described herein to features generated from customer data 350 (e.g., store history data 354, online history data 356) to generate output data characterizing a predicted demand. For example, DFPR computing device 102 may parse customer data 350 to determine transactions involving an item during a temporal interval (e.g., last week, last season, last quarter, last holiday season, etc.). Based on the determined transactions, DFPR computing device 102 may determine an amount of the item sold, and a price the items sold for in each transaction including any applicable discounts (e.g., season discount, etc.). In some examples, DFPR computing device 102 may further determine substitute items for the item (e.g., based on item substitutions 396 for the item), and determine transactions for the substitute items during the same temporal interval. DFPR computing device 102 may determine an amount of the substitute items sold, and a price the substitute items sold for in each transaction.

In some examples, DFPR computing device 102 may generate features based on the determined amounts of the item sold and their selling price, and, in some examples, on the amounts of substitute items sold, and their selling price. Additional features may also be generated based on one or more of an average price for the item, total revenue from the items sold, time data charactering a future temporal interval, event data 360 corresponding to the temporal interval, and third-party item data 330 for the item or any substitute items for the item. In some examples, the features and additional features are generated based on store history data 354 for a particular store or clusters of stores pertaining to a region (e.g., zip code), or to online history data 356 for items shipped to or picked up in a particular region.

DFPR computing device 102 may apply the trained time-series model defined by the demand forecast model 380 parameters to the generated features and, in some examples, additional features, to generate output data characterizing a predicted demand 362 for the item during the future temporal interval (e.g., next week, next season, next quarter, next holiday season, etc.). For example, the output data may include a value indicating a number of the item predicted to be sold during the future temporal interval. In some examples, DFPR computing device 102 may store the predicted demand 362 in database 116.

DFPR computing device 102 may also execute a budget allocation mixed-integer model defined by the budget allocation model 384 to determine a budget allocation for a category of the item as described herein. For example, DFPR computing device 102 may determine, based on customer data 350, a mean revenue, during the temporal interval, of items in a category corresponding to the item.

Further, and based on the predicted demand and the budget allocation, DFPR computing device 102 may execute a price optimizing mixed-integer programming model defined by price optimization model 382 to determine a price 364 for the item during the future temporal interval. DFPR computing device 102 may store the recommended price 364 for the item in database 116. In some examples, DFPR computing device 102 may receive a request for a recommended price for the item for a particular future temporal interval. The request may be received from, for example, workstation 106 of store 109. In response, DFPR computing device 102 may obtain, from database 116, the recommended price 364 for the item corresponding to the requested future temporal interval, and may transmit the recommended price in response to the request.

Figure 4:
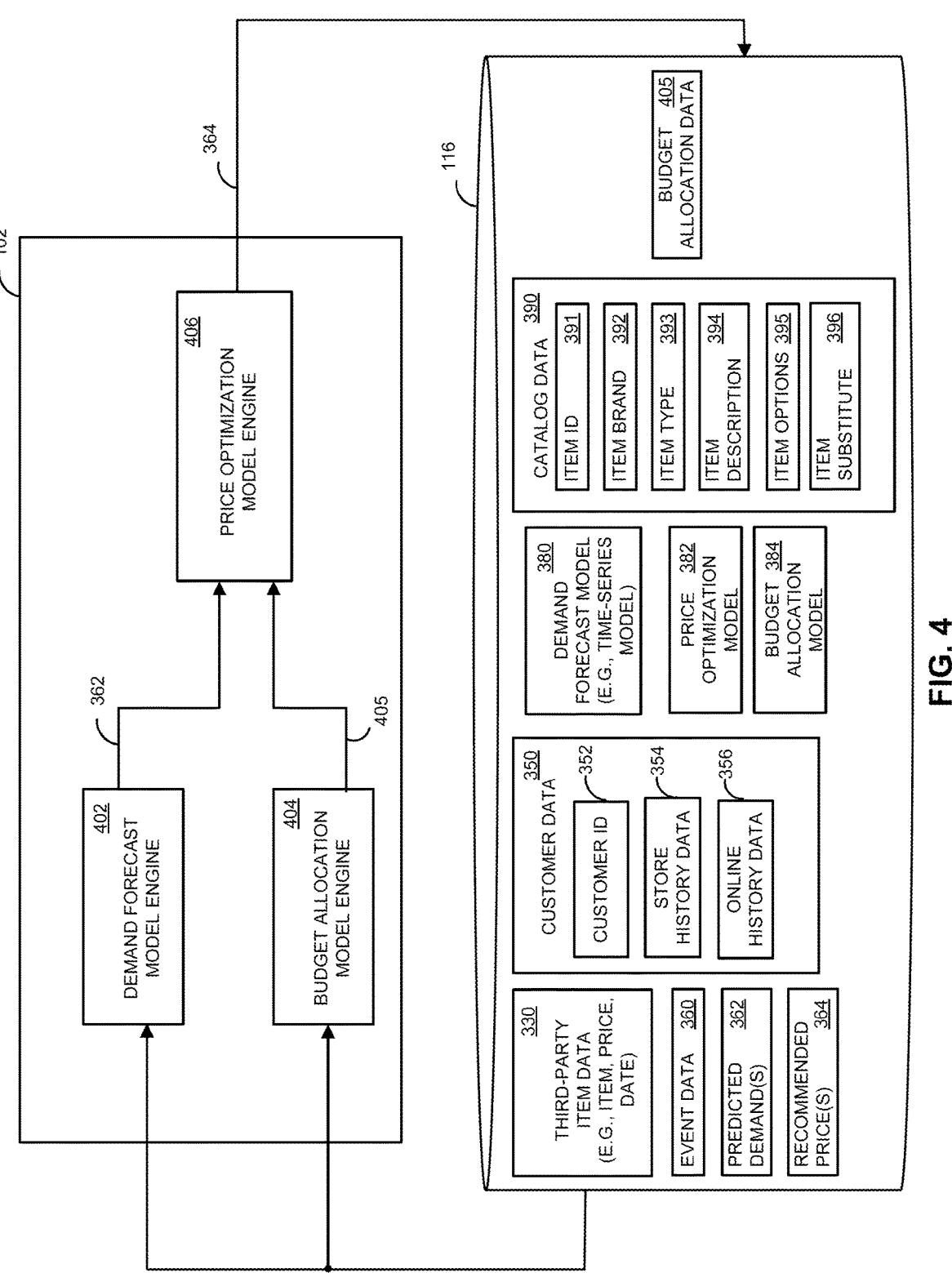

FIG. 4 illustrates exemplary portions of DFPR computing device 102 that employ trained machine learning processes to generate item demand predictions and item price recommendations. As illustrated, DFPR computing device 102 includes a demand forecast model engine 402, a budget allocation model engine 404, and a price optimization model engine 406. In some examples, one or more of demand forecast model engine 402, budget allocation model engine 404, and price optimization model engine 406 may be implemented in hardware. In some examples, one or more of demand forecast model engine 402, budget allocation model engine 404, and price optimization model engine 406 may be implemented as an executable program maintained in a tangible, non-transitory memory, such as instruction memory 207 of FIG. 2, which may be executed by one or processors, such as processor 201 of FIG. 2.

In this example, demand forecast model engine 402 may obtain from database 116 demand forecast model 380, and may configure a time-series model in accordance with demand forecast model 380 (e.g., weights) for inference. Similarly, budget allocation model engine 404 may obtain from database 116 budget allocation model 384, and may configure a budget allocation mixed-integer model with budget allocation model 384 for inference. Price optimization model engine 406 may obtain from database 116 price optimization model 382, and may configure a price optimization mixed-integer model with price optimization model 382 for inference.

Further, demand forecast model engine 402 may obtain customer data 350 for one or more items that correspond to a temporal interval (e.g., a predetermined temporal interval). The obtained customer data 350 may include store history data 354 and online history data 356 characterizing transactions involving the one or more items during the temporal interval. In some examples, demand forecast model engine 402 obtains customer data 350 for the one or more items purchased at a particular store 109, or for the one or more items purchased at a particular region (e.g., zip code), including for the one or more items purchased at stores 109 in the region or purchased online and picked up or shipped to the region. Further, demand forecast model engine 402 may generate features based on the obtained customer data 350. The features may characterize, for example, one or more of the one or more items sold during the temporal period, a price that each one of the one or more items sold for, a total amount that each of the one or more items sold for, and an average amount that each of the one or more items sold for.

In some examples, demand forecast model engine 402 may generate features based on event data 360 corresponding to the temporal interval. For example, the event data 360 may indicate a holiday season from October to January. Demand forecast model engine 402 may generate additional features characterizing the holiday season when the temporal period coincides with a time period of October to January. Further, in some examples, demand forecast model engine 402 may generate additional features based on third-party item data 330 for the one or more items that correspond to the temporal period. Additionally, in some examples, demand forecast model engine 402 may generate features based on transactions for item substitutes 396 to any of the one or more items that correspond to the temporal period, as described herein.

Further, demand forecast model engine 402 may apply the trained machine learning process (e.g., the trained time-series model) to the generated features and/or additional features to generate a predicted demand 362 for the one or more items. In some examples, demand forecast model engine 402 generates a predicted demand 362 for each of a plurality of items on an occasional basis (e.g., nightly, weekly, quarterly, monthly, etc.), and stores the predicted demand 362 for each item within database 116. In some examples, demand forecast model engine 402 generates a predicted demand 362 based on a received request for one or more items.

Budget allocation model engine 404 may obtain the customer data 350 and/or third-party item data 330 for a category of the one or more items that correspond to the temporal interval, may generate input features to input to the executed budget allocation mixed-integer model to generate budget allocation data 405. The input features may include, for example, a mean revenue of items sold during the temporal interval that are associated with the category of the one or more items. For example, budget allocation model engine 404 may obtain from catalog data 350 all transactions taking place during the temporal period that include items that belong to the category of the one or more items, and determine an average revenue generated from those transactions. Budget allocation model engine 404 may then apply the executed budget allocation mixed-integer model to the determined average revenue and to an investment amount for the category to generate the budget allocation data 405.

Price optimization model engine 406 may receive the demand forecast data 403 from demand forecast model engine 402 characterizing the predicted demand 362 for the one or more items, and the budget allocation data 405 for the category of the one or more items from budget allocation model engine 404, and may apply the executed price optimization mixed-integer model to the demand forecast data 403 and the budget allocation data 405 to generate a recommended price 364. Price optimization model engine 406 may store the recommended price 364 in database 116.

In some examples, price optimization model engine 406 generates the recommended price 364 for each of the plurality of items on an occasional basis (e.g., nightly, weekly, quarterly, monthly, etc.), and stores the recommended price 364 for each item within database 116. In some examples, price optimization model engine 406 generates a recommended price 364 based on a received request for one or more items.

Figure 5A:
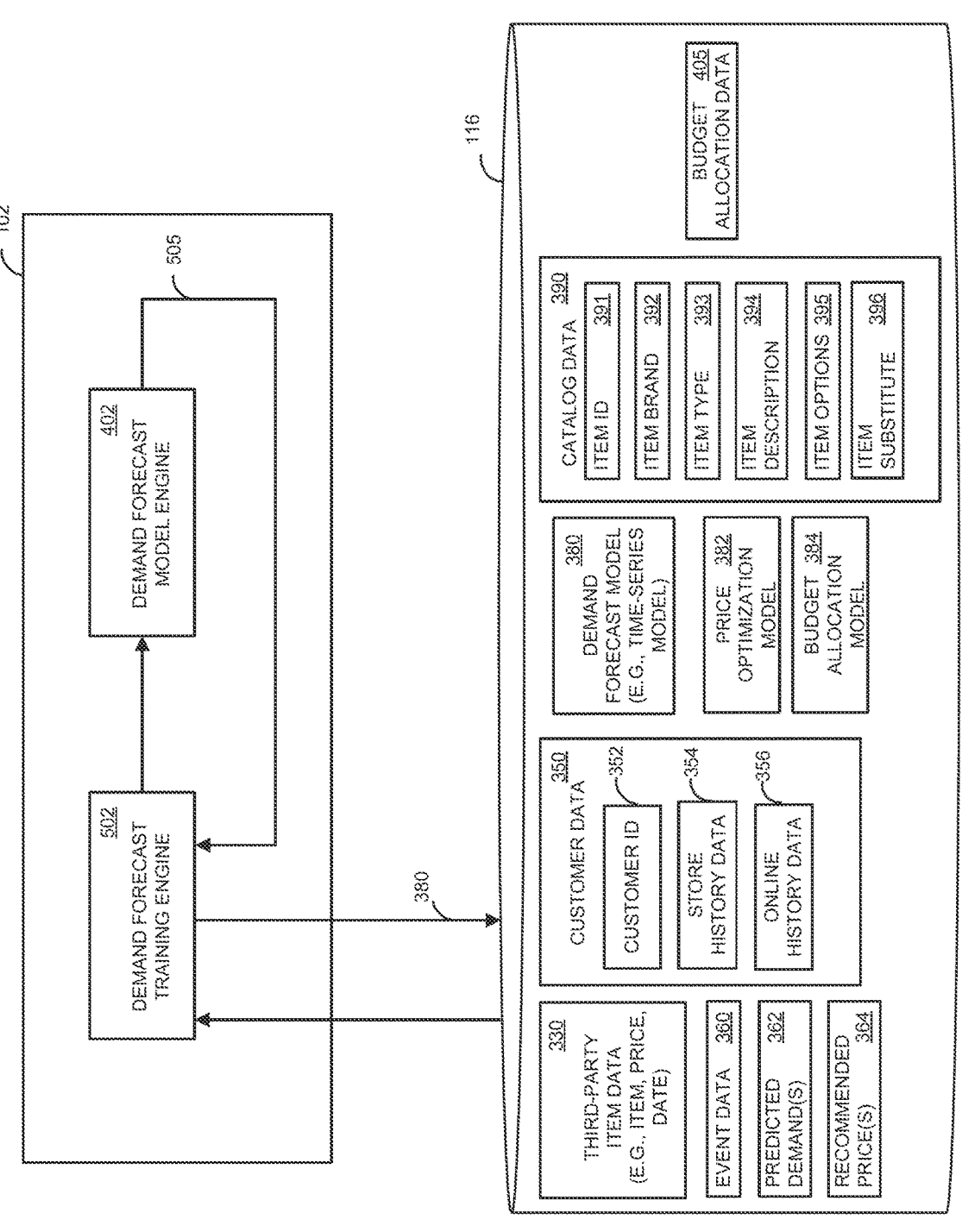

FIG. 5A illustrates exemplary portions of DFPR computing device 102 that train the time-series model executed by demand forecast model engine 402. In this example, a demand forecast training engine 502 obtains customer data 350 and/or third-party item data 330 from database 116 that include transactions for a plurality of items purchased during a first temporal interval, and generates first features based on the obtained customer data 350 and/or third-party item data 330. The first features may characterize, for example, one or more of a number of each of the plurality of items sold during the first temporal period, a price that each one of the number of each of the plurality of items was sold for, a total amount that each of the plurality of items was sold for, an average amount that each of the plurality of items was sold for, event data during the first temporal period, a date, substitute item data, and third-party data. Demand forecast training engine 502 may also obtain customer data 350 and/or third-party item data 330 from database 116 that include transactions for items purchased during a second temporal interval. The second temporal interval may come after the first temporal interval.

Figure 5B:
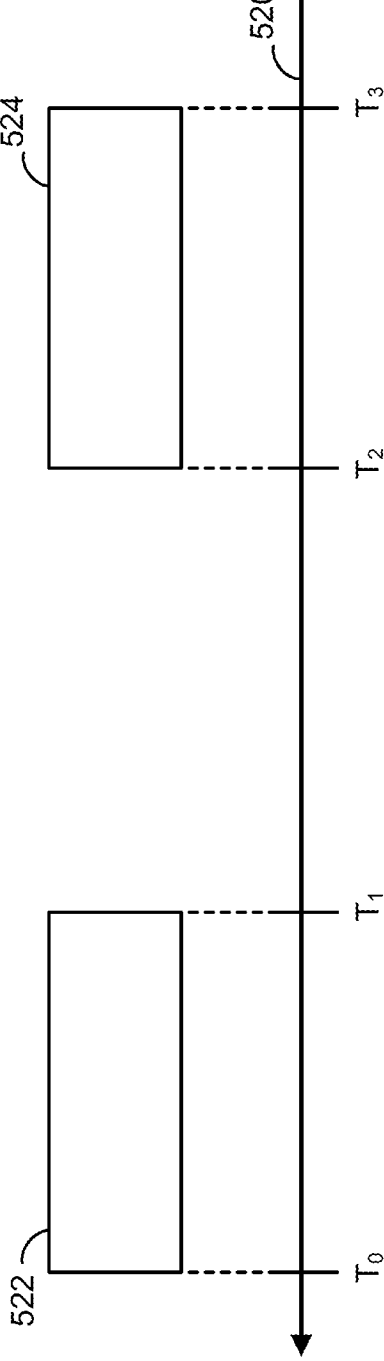
FIG. 5B illustrates a timeline associated with training a machine learning process in accordance with some embodiments.

FIG. 5B, for example, illustrates a timeline 520 with a first temporal interval defined by a first window 522, and a second temporal interval defined by a second window 524. The first window 522 includes the time period from a time $T_0$ to a time $T_1$, inclusive. The second window 524 includes the time period from a time $T_2$ to a time $T_3$, inclusive. To generate features for training, both the first window 522 and the second window 524 may represent time periods in the past such that there are transactions that have taken place during the corresponding times. During inference, however, first window 522 may represent a time period in the past (or present, e.g., real-time), while the second window 524 represents a time period in the future (e.g., the time period for which item demand is being predicted for). In some examples, the first temporal interval corresponds to a season (e.g., winter, spring, summer, fall, holiday) in a given year, and the second temporal interval corresponds to the same season the following year.

Referring back to FIG. 5A, demand forecast training engine 502 may generate second features based on the customer data 350 and/or third-party item data 330 obtained for the second temporal interval. The second features may characterize, for example, a number of each of the plurality of items sold during the second temporal period. The second features may define the "expected" output data to be generated by the time-series model when provided with the first features.

Demand forecast training engine 502 performs operations to provide the first features and the second features to demand forecasting model engine 402. Further, demand forecasting model engine 402 inputs the first features and the second features to the executed time-series model to generate output data 505 characterizing a predicted demand of the plurality of items.

In some examples, demand forecast training engine 502 trains the time-series model until at least one metric threshold is satisfied. For example, demand forecast training engine 502 may train the time-series model and determine a loss (e.g., a ranking loss) based on the output data 505 and the second features characterizing the expected outcome. Demand forecast training engine 502 may determine that training is complete when the determined loss is below a threshold. For example, if the determined loss is not below the threshold, demand forecast training engine 502 continues to train the time-series model. Once training is complete (e.g., the determined loss is below the threshold), demand forecast training engine 502 stores parameters associated with the trained time-series model as demand forecast model 380 within database 116.

Figure 6:
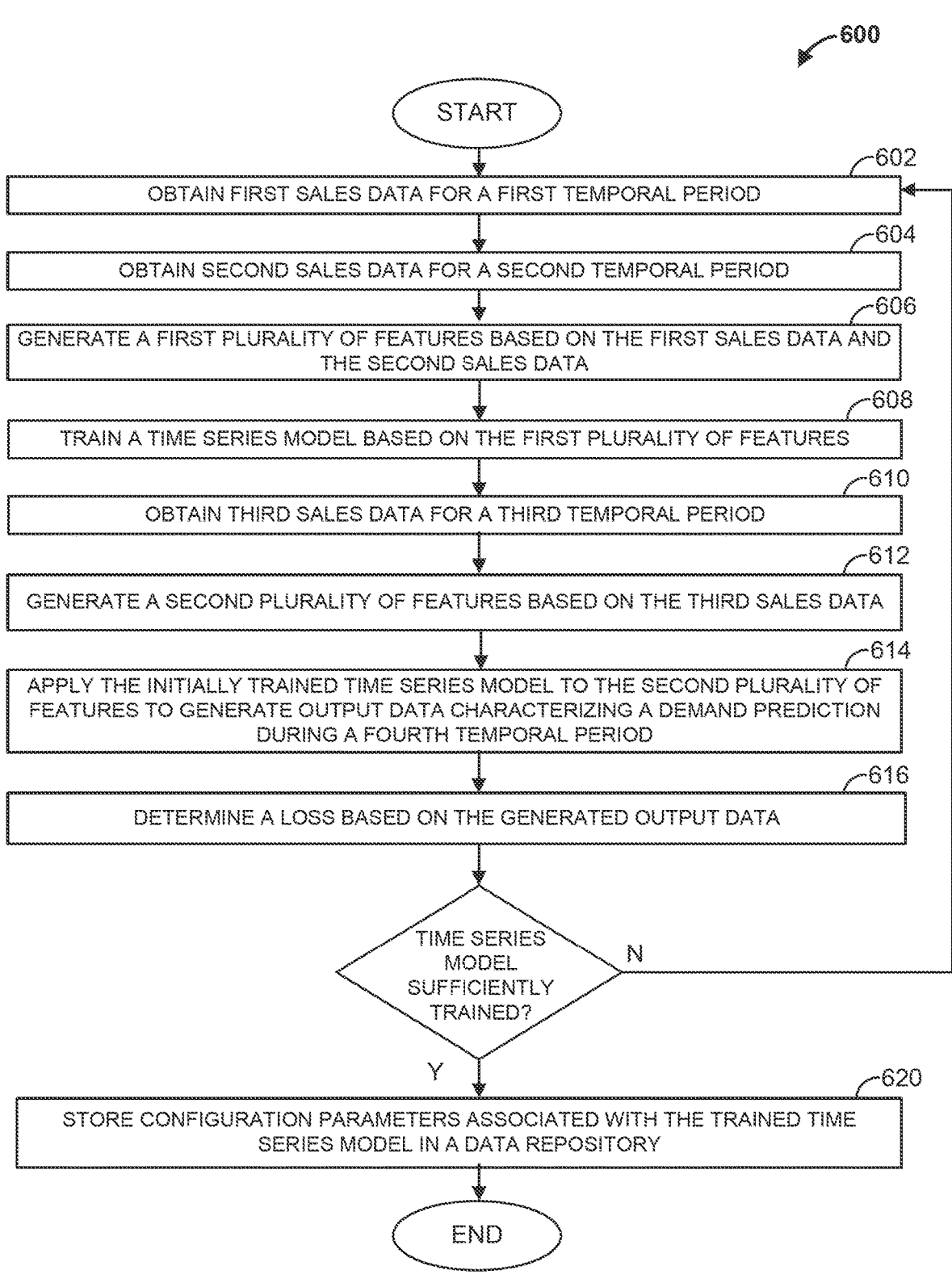
FIG. 6 is a flowchart of an example method that can be carried out by the demand forecast and price recommendation system 100 of FIG. 1 in accordance with some embodiments.

FIG. 6 is a flowchart of an example method 600 that can be carried out by the DFPR computing device 102 of FIG. 1. Beginning at step 602, DFPR computing device 102 obtains first sales data for a first temporal period. For example, DFPR computing device 102 may obtain customer data 350 and/or third-party item data 330 that includes transactions for a plurality of items that took place during the first temporal period. Further, at step 604 DFPR computing device 102 obtains second sales data for a second temporal period. For example, DFPR computing device 102 may obtain customer data 350 and/or third-party item data 330 that includes transactions for the plurality of items that took place during the second temporal period. The first temporal period may precede the second temporal period.

Proceeding to step 606, DFPR computing device 102 generates a first plurality of features based on the first sales data and the second sales data. The first plurality of features may include an input dataset, and an expected output dataset. The input dataset may characterize, for example, one or more of a number of each of the plurality of items sold during the first temporal period, a price that each one of the number of each of the plurality of items was sold for, a total amount that each of the plurality of items was sold for, an average amount that each of the plurality of items was sold for, event data during the first temporal period, a date, substitute item data, and third-party data. The expected output dataset may characterize, for example, a number of each of the plurality of items sold during the second temporal period, and a price each of the plurality of items sold for.

At step 608, DFPR computing device 102 trains a time-series model based on the first plurality of features. For example, DFPR computing device 102 may input the first plurality of features to an executed time-series model to generate output data characterizing a predicted demand of the plurality of items during the second temporal period.

At step 610, DFPR computing device 102 obtains third sales data for a third temporal period. For example, DFPR computing device 102 may obtain customer data 350 and/or third-party item data 330 that includes transactions for at least one item that took place during the third temporal period. The third temporal period, in some examples, do not overlap with any of the first temporal period and the second temporal period. In some examples, the third temporal period corresponds to a same season, but of a different year, than a season corresponding to the first temporal period. At step 612, DFPR computing device 102 generates a second plurality of features based on the third sales data. The second plurality of features may characterize, for example, one or more of a number of the at least one item sold during the first temporal period, a price that each of the at least one item sold for, a total amount that each of the at least one item sold for, an average amount that each of the at least one item sold for, event data during the third temporal period, a date, substitute item data, and third-party data.

Proceeding to step 614, DFPR computing device 102 applies the initial trained time-series model to the second plurality of features to generate output data characterizing a demand prediction of the at least one item during a forth temporal period. The third temporal period may precede the fourth temporal period. At step 616, DFPR computing device 102 determines a loss based on the generated output data. For example, DFPR computing device 102 may determine a ranking loss based on the output data and an expected demand of the at least one item during the fourth temporal period.

At step 616, DFPR computing device 102 determines whether the time series is sufficiently trained based on the determined loss. For example, DFPR computing device 102 may compare the determined loss to a predetermined threshold. If the determined loss is not below the predetermined threshold, the method proceeds back to step 602 to continue training the time-series model. If, however, the ranking loss is below the predetermined threshold, the method proceeds to step 620, where DFPR computing device 102 stores configuration parameters associated with the trained time-series model in a data repository. For example, DFPR computing device 102 may store the configuration parameters as demand forecast model 380 within database 116. The method then ends.

FIG. 7 is a flowchart of an example method 700 that can be carried out by the DFPR computing device 102 of FIG. 1. Beginning at step 702, DFPR computing device 102 obtains sales data for an item for a first temporal period. For example, DFPR computing device 102 may obtain customer data 350 and/or third-party item data 330 that includes transactions for the item that took place during the first temporal period. At step 704, DFPR computing device 102 generates a plurality of features based on the sales data. For example, the plurality of features may characterize one or more of a number of each of the plurality of items sold during the first temporal period, a price that each one of the number of each of the plurality of items was sold for, a total amount that each of the plurality of items was sold for, an average amount that each of the plurality of items was sold for, event data during the first temporal period, a date, substitute item data, and third-party data.

Proceeding to step 706, DFPR computing device 102 may input the generated plurality of features to a trained time-series model to generate output data characterizing a demand prediction of the item during a second temporal period. For example, DFPR computing device 102 may obtain demand forecast model 380 from database 116, and may establish the trained time-series model based on parameters identified by the demand forecast model 380. The time-series model may have been trained in accordance with the flowchart of FIG. 6, for example.

Further, and at step 708, DFPR computing device 102 determines a price for the item based on the output data. For example, DFPR computing device 102 may determine a budget allocation corresponding to a category of the item based on executing a budget allocation mixed-integer model (e.g., one in accordance with parameters stored as budget allocation model 384) that operates on values identifying a revenue corresponding to the item's category and an investment amount of the category, as described herein. DFPR computing device 102 may then determine the price based on the output data characterizing the predicted demand and the determined budget allocation. For example, DFPR computing device 102 may execute a price optimization mixed-integer model (e.g., one in accordance with parameters stored as price optimization model 382) that operates on the output data and the budget allocation to generate data identifying the price.

At step 710, DFPR computing device 102 stores the price for the item in a data repository (e.g., recommended price 364 within database 116). The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The following clause listing includes exemplary embodiments.

1. A system comprising:

a computing device comprising at least one processor, where the computing device is configured to:

obtain sales data corresponding to a first temporal period of at least one item;

generate a plurality of features based on the sales data;

input the plurality of features to a trained machine learning process to generate output data characterizing a demand of the at least one item during a second temporal period; and store the output data in a data repository.

2. The system of clause 1, wherein the computing device is configured to:

determine a price for the at least one item based on the output data; and store the price in a data repository.

3. The system of clause 2, wherein determining the price comprises:

determining a plurality of items in a same category as the at least one item;

determining, based on the sales data, a revenue value for the plurality of items based on sales of the plurality of items during the first temporal period;

determining a budget allocation for the at least one item based on the revenue; and determining the price based on the budget allocation.

4. The system of clause 3, wherein determining the budget allocation comprises applying a mixed-integer model to the revenue value.

5. The system of any of clauses 2-4, wherein determining the price comprises applying a mixed-integer model to the output data.

6. The system of any of clauses 2-5, wherein the computing device is configured to:

receive a price request for the at least one item for a requested temporal period;

determine the requested temporal period coincides with the second temporal period; and transmit, in response to the price request, the price for the at least one item.

7. The system of any of clauses 1-6, wherein the plurality of features characterize a number of sales of the at least one item during the first temporal period, and a price that each of the at least one item sold for in each of the number of sales.

8. The system of any of clauses 1-7, wherein the computing device is configured to:

determine at least one substitute item for the at least one item;

obtain additional sales data for the at least one substitute item;

generate an additional plurality of features based on the additional sales data; and input the additional plurality of features to the trained machine learning process to generate the output data.

9. The system of any of clauses 1-8, wherein the first temporal period precedes the second temporal period.

10. The system of any of clauses 1-9, wherein inputting the generated plurality of features to the trained machine learning process comprises establishing a time-series model.

11. A method comprising:

obtaining first textual data for a first item;

obtaining second textual data for a second item;

generating a plurality of features based on the first textual data and the second textual data;

inputting the generated plurality of features to a trained machine learning process to generate output data characterizing a textual similarity between the first textual data and the second textual data;

determining whether the first item maps to the second item based on the output data;

generating mapping data based on the determination; and storing the mapping data in a data repository.

12. The method of clause 11 further comprising:

determining a price for the at least one item based on the output data; and storing the price in a data repository.

13. The method of clause 12, wherein determining the price comprises:

determining a plurality of items in a same category as the at least one item;

determining, based on the sales data, a revenue value for the plurality of items based on sales of the plurality of items during the first temporal period;

determining a budget allocation for the at least one item based on the revenue; and determining the price based on the budget allocation.

14. The method of clause 13, wherein determining the budget allocation comprises applying a mixed-integer model to the revenue value.

15. The method of any of clauses 12-14, wherein determining the price comprises applying a mixed-integer model to the output data.

16. The method of any of clauses 12-17, the method further comprising:

receiving a price request for the at least one item for a requested temporal period;

determining the requested temporal period coincides with the second temporal period; and transmitting, in response to the price request, the price for the at least one item.

17. The method of any of clauses 11-16, wherein the plurality of features characterize a number of sales of the at least one item during the first temporal period, and a price that each of the at least one item sold for in each of the number of sales.

18. The method of any of clauses 11-17, the method further comprising:

determining at least one substitute item for the at least one item;

obtaining additional sales data for the at least one substitute item;

generating an additional plurality of features based on the additional sales data; and inputting the additional plurality of features to the trained machine learning process to generate the output data.

19. The method of any of clauses 11-18, wherein the first temporal period precedes the second temporal period.

20 The method of any of clauses 11-19, wherein inputting the generated plurality of features to the trained machine learning process comprises establishing a time-series model.

21

21. A non-transitory computer readable medium having instructions stored thereon, wherein the instructions, when executed by at least one processor, cause a device to perform operations comprising:
obtaining first textual data for a first item;
obtaining second textual data for a second item;
generating a plurality of features based on the first textual data and the second textual data;
inputting the generated plurality of features to a trained machine learning process to generate output data characterizing a textual similarity between the first textual data and the second textual data;
determining whether the first item maps to the second item based on the output data;
generating mapping data based on the determination; and
storing the mapping data in a data repository.
22. The non-transitory computer readable medium of clause 21, wherein the instructions, when executed by the at least one processor, cause the device to perform operations comprising:
determining a price for the at least one item based on the output data; and
storing the price in a data repository.
23. The non-transitory computer readable medium of clause 22, wherein determining the price comprises:
determining a plurality of items in a same category as the at least one item;
determining, based on the sales data, a revenue value for the plurality of items based on sales of the plurality of items during the first temporal period;
determining a budget allocation for the at least one item based on the revenue; and
determining the price based on the budget allocation.
24. The non-transitory computer readable medium of clause 23, wherein determining the budget allocation comprises applying a mixed-integer model to the revenue value.
25. The non-transitory computer readable medium of any of clauses 22-24, wherein determining the price comprises applying a mixed-integer model to the output data.
26. The non-transitory computer readable medium of any of clauses 22-25, wherein the instructions, when executed by the at least one processor, cause the device to perform operations comprising:
receiving a price request for the at least one item for a requested temporal period;
determining the requested temporal period coincides with the second temporal period; and
transmitting, in response to the price request, the price for the at least one item.
27. The non-transitory computer readable medium of any of clauses 21-26, wherein the plurality of features characterize a number of sales of the at least one item during the first temporal period, and a price that each of the at least one item sold for in each of the number of sales.
28. The non-transitory computer readable medium of any of clauses 21-27, wherein the instructions, when executed by the at least one processor, cause the device to perform operations comprising:
determining at least one substitute item for the at least one item;
obtaining additional sales data for the at least one substitute item;
generating an additional plurality of features based on the additional sales data; and

inputting the additional plurality of features to the trained machine learning process to generate the output data.
29. The non-transitory computer readable medium of any of clauses 21-28, wherein the first temporal period precedes the second temporal period.
30. The non-transitory computer readable medium of any of clauses 21-29, wherein inputting the generated plurality of features to the trained machine learning process comprises establishing a time-series model.
The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
a processor; and
a non-transitory memory storing instructions that, when executed, cause the processor, to:
receive an initial request generated from a user interface displayed at a first computing device, the initial request defining a temporal frequency for generating for a recommendation for an item during a second temporal period;
obtain historical data corresponding to a first temporal period of at least one item based on the initial request;
generate a respective first plurality of first features based on the historical data;
train a respective initial time-series model by:
inputting a training set of first features for a first prior temporal period as an input dataset and outputting an expected set of second features, wherein the expected set of second features correspond to a second prior temporal period different than the first prior temporal period, wherein a first plurality of parameters comprising one or more hyperparameters, one or more configuration settings, and one or more weight values collectively utilized to output the expected set of second features;
generating a plurality of additional features based on a testing data set and the first plurality of parameters, wherein the testing data set includes features generated from historical data different than the training set of first features;
applying the respective initial time-series model and the first plurality of parameters to the plurality of additional features to generate output data characterizing a predicted demand;
determining a first ranking loss based on the expected set of second features and the output data;
based on a determination that the first ranking loss is outside a predetermined threshold, generating an additional training set comprising (i) a different plurality of additional features and (ii) additional output data and repeat the inputting through the applying of the training of the respective initial time-series model using the additional training set and a different plurality of parameters comprising a first hyperparameter, a first configuration setting, and a first weight value, different from the one or more hyperparameters, the one or more configuration settings, and the one or more weight values of the first plurality of parameters;

determining a second ranking loss based on the different plurality of additional features and the additional output data; and based on the determination that the second ranking loss is within the predetermined threshold, storing the different plurality of additional features associated with the respective initial time-series model for each respective plurality of first features, thereby forming a respective trained time-series model;

input the respective first plurality of first features to the respective trained time-series model to generate an output of a respective plurality of second features characterizing a demand of the at least one item during the second temporal period;

determine, by a first mixed integer model different from the respective trained time-series model, a respective third plurality of features based on a performance prediction for a category of the at least one item;

determine, by a second mixed integer model, a respective fourth plurality of features for the at least one item during the second temporal period, wherein the second mixed integer model is different from the first mixed integer model and receives the respective second plurality of features and the respective third plurality of features as inputs;

store, at a database associated with the system, the respective plurality of second features characterizing the demand of the at least one item during the second temporal period, the respective third plurality of features and the respective fourth plurality of features to a second computing device;

input, in accordance with a determination a cycle of the temporal frequency is deemed complete, the respective plurality of second features to the respective initial trained time-series model using the different plurality of parameters to receive as output a first recommendation value for a first item during a third temporal period, different from the second temporal period and the first temporal period, and a second recommendation value for a second item different from the first item during the third temporal period;

store, at the database, during the third temporal period, the first recommendation value for the first item, causing display of a visualization of the first recommendation value for the first item and the second recommended value for the second item during the third period on a population of computing devices different from the first computing device;

obtain, via a communication network, interaction data corresponding to one or more affirmations of the first recommendation value for the first item and one or more affirmations of the second recommendation value for the second item by the population of computing devices;

input the respective plurality of second features and the interaction data to the respective initial trained time-series model using the different plurality of parameters as a second input dataset to receive as output a third recommend value for the first item during a fourth temporal period, after the third temporal period, based on the one or more affirmations of the first recommendation value and a fourth recommendation value for the second item during the fourth temporal period based on the one or more affirmations of the second recommendation value, based on a determination that an expected loss is outside a predetermined threshold associated with the second prior temporal period, generating another additional training set and repeat the inputting through the applying of the training of the respective initial trained time-series model using the respective plurality of second features and the interaction data and another different plurality of parameters, and further store, at the database, during the fourth temporal period, the third recommendation value for the first item and the second recommendation value for the second item, causing display of a visualization of the third recommendation value for the first item and the second recommended value for the second item during the fourth period on a second population of computing devices different from the first computing device.

2. The system of claim 1, wherein the instructions cause the processor to:

determine a numerical attribute for the at least one item based on the output data; and store the numerical attribute in a data repository.

3. The system of claim 2, wherein the determining the numerical attribute comprises:

determining a plurality of items in a same category as the at least one item;

determining, based on the historical data, a performance value for the plurality of items during the first temporal period;

determining a finite resource allocation for the at least one item based on the performance value; and determining the numerical attribute based on the finite resource allocation.

4. The system of claim 3, wherein determining the finite resource allocation comprises applying a mixed-integer model to the performance value.

5. The system of claim 2, wherein determining the numerical attribute comprises applying a mixed-integer model to the output data using an inference process.

6. The system of claim 2, wherein the instructions cause the processor to:

receive a request for a numerical attribute associated with the at least one item for a requested temporal period;

determine the requested temporal period coincides with the second temporal period; and transmit, in response to the request, the numerical attribute for the at least one item.

7. The system of claim 1, wherein the plurality of features characterize a rate of change associated with the at least one item during the first temporal period, and a range of numerical attributes associated each of the at least one item during the first temporal period.

8. The system of claim 1, wherein the instructions cause the processor to:

determine at least one substitute item for the at least one item;

obtain additional historical data for the at least one substitute item;

generate an additional plurality of features based on the additional historical data; and input the additional plurality of features to the respective initial time-series model to generate the output data.

9. The system of claim 1, wherein the generating the additional training set to train the respective initial time-series model using the additional training set is performed at least three instances until the ranking loss is within the predetermined threshold.

10. The system of claim 9, wherein the instructions cause the processor to, during the training of the respective initial time series model by, change an attribute associated with one or more hyperparameters, one or more configuration settings, one or more weights, or a combination thereof associated with the respective initial time-series model.

11. The system of claim 10, wherein the instructions cause the processor to store the at least the change of the attribute associated with the one or more hyperparameters, the one or more configuration settings, the one or more weights, or the combination thereof associated with the respective initial time-series model for use by the first mixed integer model, the second mixed integer model, another model, or a combination thereof.

12. The system of claim 9, wherein the generating the additional training set to train the respective initial time-series model using the additional training set comprises a coarse grain change of the attribute associated with a first instance of the generating and a fine grain change of the attribute associated with a second instance of the generating performed after the first instance.

13. The system of claim 1, wherein the obtaining the historical data and the generating the respective first plurality of features is performed in less than 100 milliseconds.

14. The system of claim 1, wherein the initial request comprises item catalog data defining a corresponding plurality of items available at a physical location associated with the request, and the transmitting the respective plurality of second features further comprises transmitting one or more instructions for updating the item catalog data in accordance with the respective plurality of second features, the respective plurality of third features, the respective plurality of fourth features, or a combination thereof.

15. The system of claim 1, wherein the determining the respective fourth plurality of features comprises a mapping between one or more features in the respective second plurality of features and one or more features in the respective third plurality of features.

16. The system of claim 1, wherein the generating the output of the respective plurality of second features comprises performing an inference process using the respective trained time-series model to generate the respective plurality of second features.

17. The system of claim 1, wherein the request for the recommendation comprises an address associated with the computing device, the respective plurality of second features characterizes the demand of the at least one item at the address associated with the computing device during the second temporal period, and wherein instructions cause the processor to receive, responsive to the transmitting the respective plurality of second features, a request for delivery of one or more of the item to a physical address associated with the computing device.

18. The system of claim 1, wherein the initial request comprises an address associated with the computing device, the generating the output of a respective plurality of second features characterizing the demand of the at least one item during the second temporal period comprises (i) identifying a plurality of addresses comprising the address, and (ii) selecting a set of addresses in the plurality of addresses different the address and proximate to address using a clustering process, and the demand of the at least one item during the second temporal period is based on a corresponding demand of the at least one item at each address in the set of address.

19. A method, performed by at least one processor, comprising:

receiving an initial request generated from a user interface displayed at a first computing device, the initial request defining a temporal frequency for generating for a recommendation for an item during a second temporal period;

obtaining historical data corresponding to a first temporal period of at least one item based on the initial request;

generating a respective first plurality of first features based on the historical data;

train a respective initial time-series model by:

inputting a training set of first features for a first prior temporal period as an input dataset and outputting an expected set of second features, wherein the expected set of second features correspond to a second prior temporal period different than the first prior temporal period, wherein a first plurality of parameters comprising one or more hyperparameters, one or more configuration settings, and one or more weight values collectively utilized to output the expected set of second features;

generating a plurality of additional features based on a testing data set and the first plurality of parameters, wherein the testing data set includes features generated from historical data different than the training set of first features;

applying the respective initial time-series model and the first plurality of parameters to the plurality of additional features to generate output data characterizing a predicted demand;

determining a first ranking loss based on the expected set of second features and the output data;

determining that the first ranking loss is outside a predetermined threshold, and generating an additional training set comprising (i) a different plurality of additional features and (ii) additional output data and repeat the inputting through the applying of the training of the respective initial time-series model using the additional training set and a different plurality of parameters comprising a first hyperparameter, a first configuration setting, and a first weight value, different from the one or more hyperparameters, the one or more configuration settings, and the one or more weight values of the first plurality of parameters;

determining a second ranking loss based on the different plurality of additional features and the additional output data; and determining that the second ranking loss is within the predetermined threshold, and storing the different plurality of additional features associated with the respective initial time-series model for each respective plurality of first features, thereby forming a respective trained time-series model;

inputting the respective first plurality of first features to the respective trained time-series model to generate an output of a respective plurality of second features characterizing a demand of the at least one item during the second temporal period;

determining, by a first mixed integer model different from the respective trained time-series model, a respective third plurality of features based on a performance prediction for a category of the at least one item;

determining, by a second mixed integer model, a respective fourth plurality of features for the at least one item during the second temporal period, wherein the second mixed integer model is different from the first mixed integer model and receives the respective second plurality of features and the respective third plurality of features as inputs;

storing, at a database associated with the system, the respective plurality of second features characterizing the demand of the at least one item during the second temporal period, the respective third plurality of features and the respective fourth plurality of features to a second computing device;

inputting, in accordance with a determination a cycle of the temporal frequency is deemed complete, the respective plurality of second features to the respective initial trained time-series model using the different plurality of parameters to receive as output a first recommendation value for a first item during a third temporal period, different from the second temporal period and the first temporal period, and a second recommendation value for a second item different from the first item during the third temporal period;

storing, at the database, during the third temporal period, the first recommendation value for the first item, causing display of a visualization of the first recommendation value for the first item and the second recommended value for the second item during the third period on a population of computing devices different from the first computing device;

obtaining, via a communication network, interaction data corresponding to one or more affirmations of the first recommendation value for the first item and one or more affirmations of the second recommendation value for the second item by the population of computing devices;

inputting the respective plurality of second features and the interaction data to the respective initial trained time-series model using the different plurality of parameters as a second input dataset to receive as output a third recommend value for the first item during a fourth temporal period, after the third temporal period, based on the one or more affirmations of the first recommendation value and a fourth recommendation value for the second item during the fourth temporal period based on the one or more affirmations of the second recommendation value, determining that an expected loss is outside a predetermined threshold associated with the second prior temporal period, and generating another additional training set and repeat the inputting through the applying of the training of the respective initial trained time-series model using the respective plurality of second features and the interaction data and another different plurality of parameters, and further storing, at the database, during the fourth temporal period, the third recommendation value for the first item and the second recommendation value for the second item, causing display of a visualization of the third recommendation value for the first item and the second recommended value for the second item during the fourth period on a second population of computing devices different from the first computing device.

20. A non-transitory computer readable medium having instructions stored thereon, wherein the instructions, when executed by at least one processor, cause a device to perform operations comprising:

receive an initial request generated from a user interface displayed at a first computing device, the initial request defining a temporal frequency for generating for a recommendation for an item during a second temporal period;

obtain historical data corresponding to a first temporal period of at least one item based on the initial request;

generate a respective first plurality of first features based on the historical data;

train a respective initial time-series model by:

inputting a training set of first features for a first prior temporal period as an input dataset and outputting an expected set of second features, wherein the expected set of second features correspond to a second prior temporal period different than the first prior temporal period, wherein a first plurality of parameters comprising one or more hyperparameters, one or more configuration settings, and one or more weight values collectively utilized to output the expected set of second features;

generating a plurality of additional features based on a testing data set and the first plurality of parameters, wherein the testing data set includes features generated from historical data different than the training set of first features;

applying the respective initial time-series model and the first plurality of parameters to the plurality of additional features to generate output data characterizing a predicted demand;

determining a first ranking loss based on the expected set of second features and the output data;

based on a determination that the first ranking loss is outside a predetermined threshold, generating an additional training set comprising (i) a different plurality of additional features and (ii) additional output data and repeat the inputting through the applying of the training of the respective initial time-series model using the additional training set and a different plurality of parameters comprising a first hyperparameter, a first configuration setting, and a first weight value, different from the one or more hyperparameters, the one or more configuration settings, and the one or more weight values of the first plurality of parameters;

determining a second ranking loss based on the different plurality of additional features and the additional output data; and based on the determination that the second ranking loss is within the predetermined threshold, storing the different plurality of additional features associated with the respective initial time-series model for each respective plurality of first features, thereby forming a respective trained time-series model;

input the respective first plurality of first features to the respective trained time-series model to generate an output of a respective plurality of second features characterizing a demand of the at least one item during the second temporal period;

determine, by a first mixed integer model different from the respective trained time-series model, a respective third plurality of features based on a performance prediction for a category of the at least one item;

determine, by a second mixed integer model, a respective fourth plurality of features for the at least one item during the second temporal period, wherein the second mixed integer model is different from the first mixed integer model and receives the respective second plurality of features and the respective third plurality of features as inputs;

store, at a database associated with the system, the respective plurality of second features characterizing the demand of the at least one item during the second temporal period, the respective third plurality of features and the respective fourth plurality of features to a second computing device;

input, in accordance with a determination a cycle of the temporal frequency is deemed complete, the respective plurality of second features to the respective initial trained time-series model using the different plurality of parameters to receive as output a first recommendation value for a first item during a third temporal period, different from the second temporal period and the first temporal period, and a second recommendation value for a second item different from the first item during the third temporal period;

store, at the database, during the third temporal period, the first recommendation value for the first item, causing display of a visualization of the first recommendation value for the first item and the second recommended value for the second item during the third period on a population of computing devices different from the first computing device;

obtain, via a communication network, interaction data corresponding to one or more affirmations of the first recommendation value for the first item and one or more affirmations of the second recommendation value for the second item by the population of computing devices;

input the respective plurality of second features and the interaction data to the respective initial trained time-series model using the different plurality of parameters as a second input dataset to receive as output a third recommend value for the first item during a fourth temporal period, after the third temporal period, based on the one or more affirmations of the first recommendation value and a fourth recommendation value for the second item during the fourth temporal period based on the one or more affirmations of the second recommendation value, based on a determination that an expected loss is outside a predetermined threshold associated with the second prior temporal period, generating another additional training set and repeat the inputting through the applying of the training of the respective initial trained time-series model using the respective plurality of second features and the interaction data and another different plurality of parameters, and further store, at the database, during the fourth temporal period, the third recommendation value for the first item and the second recommendation value for the second item, causing display of a visualization of the third recommendation value for the first item and the second recommended value for the second item during the fourth period on a second population of computing devices different from the first computing device.

* * * * *